Aug. 10, 1965  ISOWO KUNO ETAL  3,199,442
VIBRATION PREVENTING DEVICES FOR ROLL STACKS
Filed April 11, 1962  4 Sheets-Sheet 1
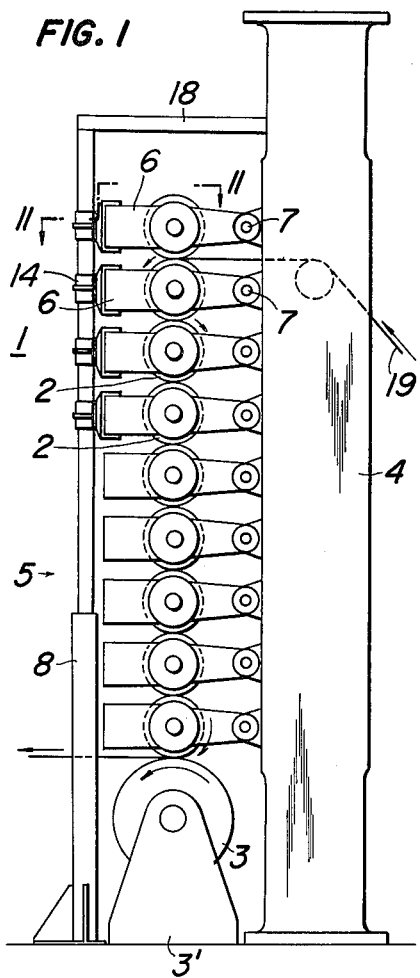
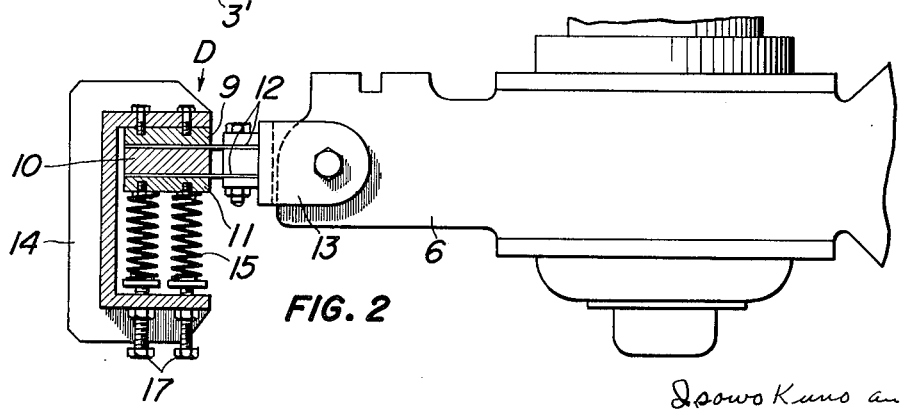

Aug. 10, 1965  ISOWO KUNO ETAL  3,199,442
VIBRATION PREVENTING DEVICES FOR ROLL STACKS
Filed April 11, 1962  4 Sheets-Sheet 2

Isowo Kuno and
Toshio Niimi, Inventors
By Wenderoth, Lind
and Ponack,
attorneys

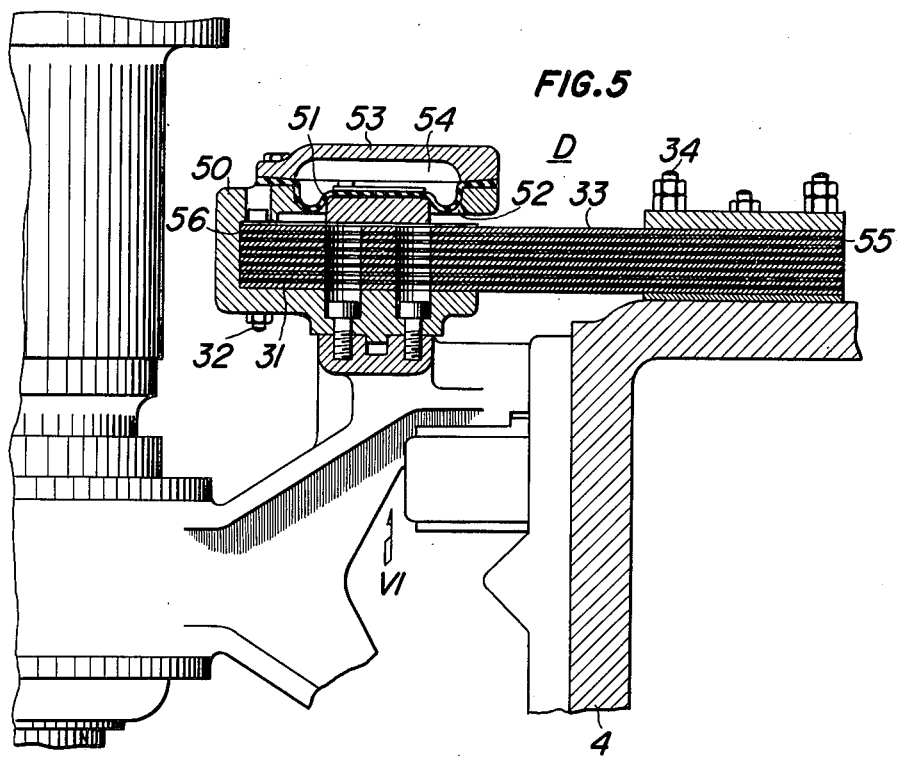
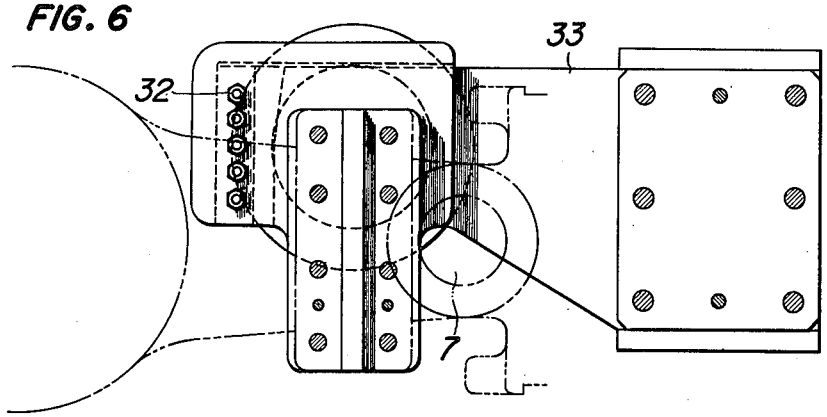

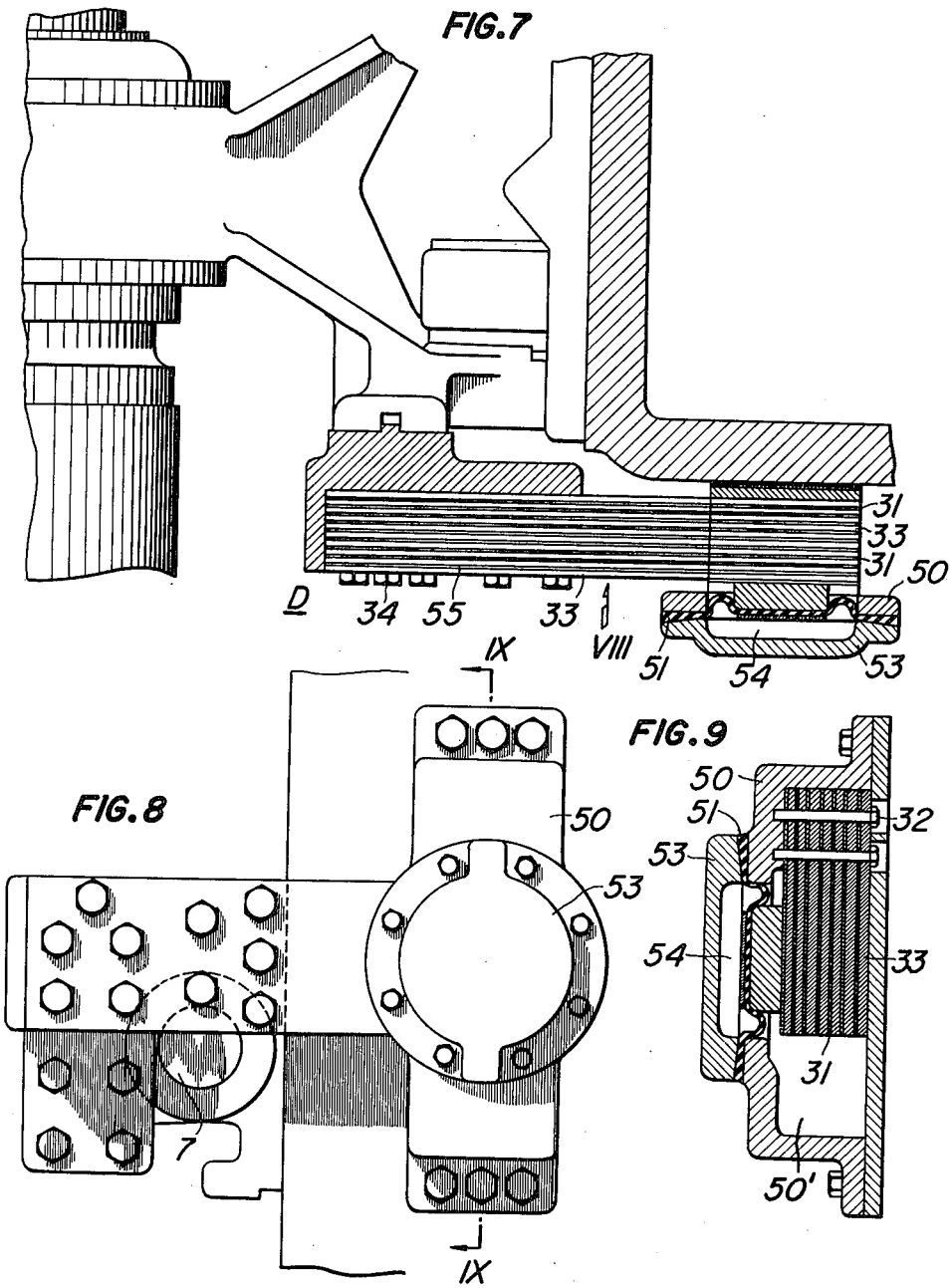

United States Patent Office 3,199,442
Patented Aug. 10, 1965

3,199,442
VIBRATION PREVENTING DEVICES FOR ROLL STACKS
Isowo Kuno, Tokyo, and Toshio Niimi, Mihara, Japan, assignors to Shin-Mitsubishi Jukogyo Kabushiki Kaisha, Tokyo, Japan, a corporation of Japan
Filed Apr. 11, 1962, Ser. No. 186,663
Claims priority, application Japan, Apr. 19, 1961, 36/13,995
4 Claims. (Cl. 100—163)

This invention relates to a vibration preventing device for a roll stack which effects pressing, polishing, smoothing or other similar treatment of web materials.

It is well known that in any conventional type of roll stack for effecting pressing, polishing, smoothing or other similar treatment of web materials such as steel strips, thermoplastic films or paper sheets, individual rolls forming the roll stack have a tendency to generate self-excited vibration resulting from the eccentricities and polygonal shapes of the same, or for other reasons. This makes the processed web uneven in thickness resulting in disadvantages such as a decrease in strength and deterioration of external appearance and other properties. Therefore, the finished product will be reduced in commercial value. In order to avoid or minimize these disadvantages there have been previously proposed various measures such as reduction in the number of rolls and decrease in their operating speeds. However, if the number of rolls is reduced the processsed web will have irregular surfaces and be reduced in is commercial value. On the other hand, the decrease in the operating speeds of the rolls leads to a low yield and hence to poor economy.

The chief object of the invention is to eliminate the aforesaid disadvantages by the provision of a vibration preventing device for a roll stack of the type above described including a damper mechanism provided on a roll carrying or bearing member for one of rolls forming the roll stack to absorb any self-excited vibration of that roll to thereby prevent said vibration from appearing on the roll stack.

Another object of the invention is to provide a vibration preventing device for a roll stack of the type above described in which, for said damper mechanism set forth in the preceding paragraph, there can be used any frictional, dynamic and viscous dampers which are simple in construction and reliable in operation.

These objects and other objects are accomplished by the present invention as will be apparent from the following detailed description taken in conjunction with the accompanying drawings in which:

FIG. 1 is a diagrammatic elevational view of a calender apparatus of a paper calendering machine embodying the teachings of the invention;

FIG. 2 is a fragmental cross-sectional view taken on the line II—II of FIG. 1;

FIG. 5 is a diagrammatic fragmentary view, partly in plan and partly in section of another modification of the invention;

FIG. 6 is a side elevational view of the device as viewed in the direction of arrow VI in FIG. 5;

FIG. 7 is a diagrammatic fragmentary view, partly in plan and partly in section of a still further modification of the invention;

FIG. 8 is a plan view of the device as viewed in the direction of arrow VIII in FIG. 7; and FIG. 9 is a section taken on the line IX—IX of FIG. 8.

Figure 3:
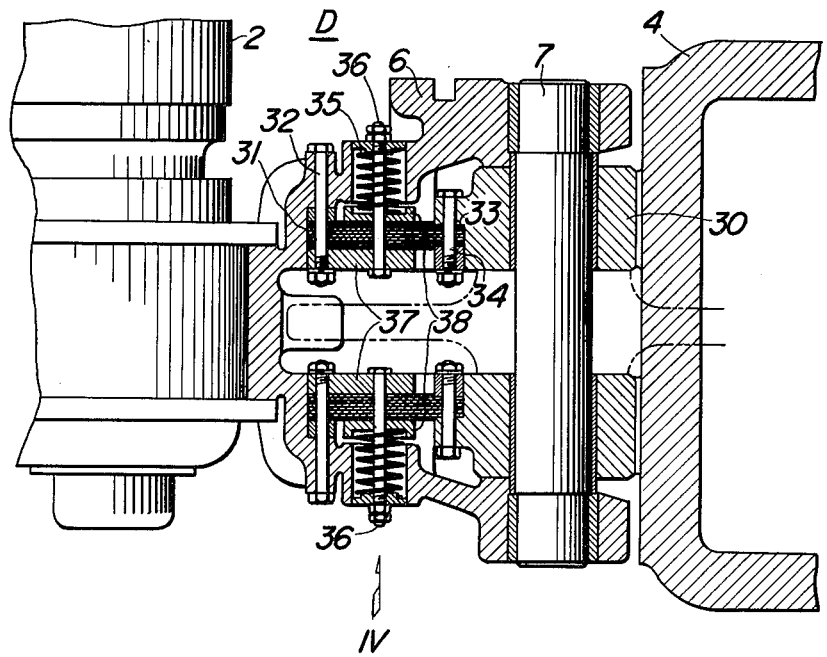
FIG. 3 is a diagrammatic fragmentary view, partly in plan and partly in section of a modification of the invention.

The invention is particularly suitable for use with a calender apparatus of a paper machine and accordingly will be described in conjunction with such an apparatus. However, it is to be understood that the invention is equally applicable to a roll stack used with a rolling mill for steel strip or any apparatus for producing and/or processing web materials such as thermo-plastic films and the like.

Referring now to FIGS. 1 and 2 of the drawings, there is illustrated a calender apparatus of a paper machine embodying the teachings of the invention. A calender apparatus includes a roll stack generally designated by the reference numeral 1 and comprising a plurality of stacked rolls 2, the lowermost or bottom roll 3 rotatably mounted on a base frame 3′, a stationary frame 4 and a supporting post device 5. The base frame 3′ and the stationary frame 4 are fixed on a foundation. As shown in FIG. 1, the plurality of rolls 2 are vertically resting on one another and upon the bottom roll 3 and are in operaivetly contacting relationship and capable of slight vertical movement. Each roll 2 is rotatably supported by a roll carrying or bearing member 6 and adapted to be frictionally driven as will be apparent hereinafter. The roll carrying or bearing member 6 is rockably mounted to the frame 4 by a pin 7. This permits the associated roll 2 to effect slight vertical movement. The supporting post device 5 comprises an upright post 8 rigidly secured to the foundation and three stationary plate members 9, 10 and 11 longitudinally aligned with each other with a predetermined spacing maintained between any two adjacent plate members. The rolls 2 can be supported by bearing means of the same construction and therefore the bearing means will now be described in conjunction with the uppermost roll 2.

As shown in FIG. 2, a pair of spaced leaf springs 12 have their free end portions slidably interleaved with the plate members 9 and 10, and with the plate members 10 and 11 respectively, and the other ends rigidly secured to a bracket 13 which, in turn, is mounted on that end of the bearing member 6 remote from the pin 7. The plate members 9, 10 and 11 cooperate with the pair of leaf springs 12 to constitute a damper mechanism D as will be described hereinafter. A bracket 14 having a cross section of channel shape has one leg suitably secured to the plate member 9. A pair of juxtaposed springs 15 are disposed between the exposed surface of the plate member 11 and the internal surface of the other leg of the bracket 14 and push the leaf springs 12 against the plate member 9 through the plate members 11 and 10 to thereby support the end of the roll bearing member 6 remote from the pin 7. Thus the plate members frictionally engage the leaf springs. The forces of the springs 15 can be controlled by rotating adjusting screws 17 extending through the other leg of the bracket 14 respectively.

The plate members 9, 10 and 11 are connected at their upper ends to the frame 4 through a connecting rod 18 ensuring that the supporting post device 5 is maintained a predetermined distance from the frame 4.

In FIG. 1 it is seen that only the four upper rolls 4 include the damper mechanism D as above described. It is, however, to be understood that the number of the damper mechanisms and which rolls are to be provided with the same can be properly selected in accordance with the number of rolls used, the operating conditions etc. If desired, any suitable numbers of the plate members and leaf springs can be used.

The arrangement thus far described is operated as follows:

A web paper 19 to be polished is fed into the calender apparatus from the right hand side thereof as viewed in FIG. 1. The web 19 travelling in the direction of arrow shown in FIG. 1 is first nipped between the uppermost roll 2 and the second roll 2 disposed immediately below and contacting the same, and as the second roll 2 is rotated in the counterclockwise direction as viewed in the same figure it is held on the peripheral surface of the same until it is nipped between the second and third rolls 2. In the same manner, the web 19 is successively passed between the pairs of mated rolls 2 rotating in the opposite directions until it is discharged from the calender apparatus between the lowermost roll 2 and the bottom roll 3. Thus the pairs of mated rolls press the web as it is passed therebetween to polish or calender the same and to make its thickness substantially uniform.

It will be readily understood that as the web paper 19 passes between a pair of mated rolls the upper roll of the pair tends to be moved upwardly a distance corresponding to the thickness of the web resulting in the generation of vibrational movement of that roll in the vertical direction. For this reason, the conventional type of calender apparatus is generally difficult to operate so that it polishes a web material passed therethrough evenly and to make its thickness uniform as previously pointed out.

With the arrangement illustrated, said upward movement of the upper roll generates a vibrational movement of that roll and the associated bearing member 6 about the associated pin 7 with respect to the lower roll. At the same time, the pair of leaf springs 12 secured to the now vibrating bearing member 6 also vibrate. As previously pointed out, the pair of leaf springs 12 are slidably interleaved with the stationary plate member 9 and 10, and with the stationary plate members 10 and 11 respectively, and are pressed against the adjacent plate members by the action of the springs 15. Therefore, the vibrational movement of the leaf springs 12 with respect to the associated plate members 9, 10 and 11 produces friction therebetween which produces a damping action for absorbing said vibrational movement of the roll. This ensures that any vibrational movement of the roll which would be otherwise produced when the same engages the web is effectively prevented. Therefore, it will be appreciated that the arrangement illustrated evenly polishes a web material passed therethrough and makes its thickness uniform.

Figure 4:
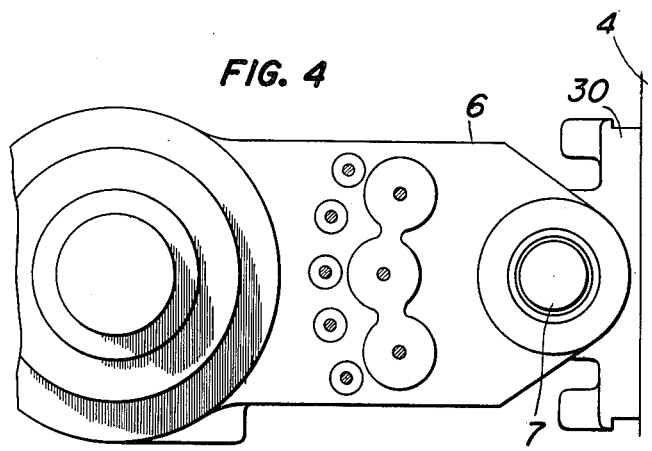
FIG. 4 is a side elevational view of the device as viewed in the direction of arrow IV in FIG. 3.

Referring now to FIGS. 3 and 4 wherein like reference numerals have been employed to identify the components similar to those shown in FIGS. 1 and 2, there is illustrated a modification of the invention including a damper mechanism disposed between a roll bearing member 6 and a frame 4. A member 6 for carrying or supporting a roll 2 is mounted so as to be rotatable about a pin 7 mounted on a bracket 30 rigidly secured to a frame 4. A damper mechanism for absorbing the vibrational movement of the roll consists of a plurality of leaf springs 31 rigidly secured at one end to the roll bearing member 6 by bolts 32 and alternating with leaf springs 33 rigidly secured at one end to the bracket 30 by bolts 34 with the leaf springs 31 in overlapping and contacting relationship with the leaf springs 33. Further the leaf springs 31 can freely slide with respect to the leaf springs 33 during the vibrational movement of the associated roll 2 and its bearing member 6. In order to effect suitable frictional engagement between the leaf springs 31 and the leaf springs 33 a resilient member, in this case a coiled spring 35, is provided to push the leaf springs 31 and 33 against each other and against a support 37 therefor and a bolt 36 serves to assemble the support 37, the leaf springs 31 and 33, a leaf-spring retainer 38 and the coiled spring 35 into a unit. It will be understood that the leaf-springs 31 and 33 are provided, in those portions where the bolt 35 and the bolts 34 or 32 for securing the mated leaf springs extend through them, with elongated openings (not shown) permitting the leaf springs 31 and 33 to be relatively moved during the vibrational movement of the associated roll 2 and its bearing member 6.

The arrangement shown in FIGS. 3 and 4 is operated in the manner similar to that previously described in conjunction with FIGS. 1 and 2. More specifically, if a web of paper to be processed is nipped between a pair of mated rolls 2 to vertically vibrate the upper one of the rolls with respect to the lower roll then there will occur a sliding movement between the leaf springs 31 mounted on the bearing member 6 and the leaf springs 33 rigidly secured to the frame 4 which sliding movement causes friction between the leaf springs 31 and 33. This friction produces a damping action for absorbing the vibrational movement of the roll. Similarly, the respective rolls forming a roll stack are effectively prevented from vibrating.

Referring now to FIGS. 5 and 6 wherein like reference numerals designate the components similar to those shown in FIGS. 3 and 4, there is illustrated an arrangement similar to that shown in FIGS. 3 and 4 except that the mounting and construction of leaf springs 31 and 33 is different and that a fluid under pressure is used to apply a pressure to the leaf springs forming the damper mechanism. As shown in FIG. 5, a plurality of leaf spring 31 are embraced in and mounted by bolts 32 on a bracket 50 rigidly secured to a roll bearing member 6. The leaf springs 31 alternate with leaf springs 33 mounted on a frame by bolts 34 in overlapping and contacting relationship and are adapted to be slidable with respect to the leaf springs 33 during the vibrational movement of the associated roll 2 and its carrying member 6. The leaf springs 31 and 33 cooperate with a fluid chamber 54 for causing contact pressure between the leaf springs 31 and 33 to form a damper mechanism D. The fluid chamber 54 comprises a diaphragm 51 for closing an opening 52 provided on the upper surface of the bracket 50 and a cover 53 screwed into the opening 52 and connected to a suitable source of fluid under pressure (not shown). The reference numerals 55 and 56 designate spacers.

It will be appreciated that the arrangement shown in FIGS. 5 and 6 is operated in a manner similar to that previously described in conjunction with FIGS. 1 through 4.

With the arrangement illustrated in FIGS. 5 and 6, the contact pressure between the plurality of leaf springs 31 operable to vibrate together with the associated roll bearing member 6 and the plurality of leaf springs 33 secured to the frame 4 can be, if desired, so controlled that when the two associated rolls begin to nip a web of paper therebetween the contact pressure is low to facilitate nipping of the web, whereas the contact pressure can be slowly increased after the rolls have nipped the web therebetween, by suitably adjusting the supply of the fluid under pressure to the fluid chamber 54 in accordance with the displacement of the roll bearing member 6.

Referring now to FIGS. 7 through 9 wherein like reference numerals have been employed to identify the components similar to those shown in FIGS. 5 and 6, there is illustrated an arrangement similar to that shown in FIGS. 5 and 6 except that a plurality of leaf springs 31 are disposed at right angles to a plurality of leaf springs 33, a bracket 50 having its vertical section of channel shape is mounted on a frame 4 and a fluid chamber 54 is disposed in a different position.

More specifically, the plurality of leaf springs 31 are mounted on a frame 4 by bolts 32 so as to be longitudinally disposed within the channel shaped hollow portion 50' of the bracket 50 also mounted on the frame 4. The plurality of leaf springs 33 are mounted on a roll bearing member 6 by bolts 34 so as to be disposed at right angles to the plurality of leaf springs 31. As shown in FIG. 8, the free ends of the leaf springs 31 contact those of the leaf springs 33 in alternating and overlapping relationship below the fluid chamber 53. It is noted that the hollow portion 50' of the bracket 50 is dimensioned such that the free ends of leaf springs 33 vibrated together with the roll carrying member 6 do not contact the internal bottom of the same.

It will be appreciated that the arrangement illustrated in FIGS. 7 through 9 is operated in the manner similar to that previously described in conjunction with FIGS. 5 and 6.

From the foregoing it will be appreciated that the objects of the invention have been accomplished by the provision of a vibration preventing device comprising a roll bearing member rockably supported on a stationary frame for bearing rotatably a roll, and a damper mechanism disposed on the roll bearing member. Rolling mills for steel strips or apparatus for producing and/or processing web materials embodying the teachings of the invention can provide excellent products with both a high speed of production and a high efficiency.

While the invention has been described in connection with the preferred embodiments thereof it is to be understood that various changes in the detail of construction and the combination and arrangement of parts may be made without departing from the spirit and scope of the invention.

What we claim is:

1. In a roll stack for processing a web material including a pair of spaced stationary supports and a plurality of rolls, a device for preventing vibrational movement of one of said rolls comprising a roll bearing member rockably mounted at one end on one of said supports to rotatably mount said roll, a damper mechanism including a plurality of plate elements on said roll bearing member at the other end, and a plurality of plate members interleaved with said plate elements and rigidly secured to the other support, and spring means bearing on said plate members for effecting frictional engagement of said plate elements with said plate members whereby the vibrational movement of said roll is absorbed by friction between said plate elements and said plate members.

2. In a rollstack for processing a web material including a stationary frame having a pair of spaced supports and a plurlity of rolls, a device for preventing vibrational movement of one of said rolls comprising a roll bearing member rockably mounted at one end on one support of said stationary frame, a damper mechanism including a plurality of leaf springs rigidly secured to said roll bearing member and a plurality of plate members interleaved with said leaf springs and rigidly coupled to the other support of said stationary frame, and means connected to said plate members for effecting frictional engagement of said leaf springs with said plate members whereby the vibrational movement of said roll is absorbed by friction between said leaf springs and said plate members.

3. A device as claimed in claim 2, wherein said means for effecting friction are spring means.

4. A device as claimed in claim 2, wherein said leaf springs frictionally engage said plate members by the action of fluid under pressure.

References Cited by the Examiner

UNITED STATES PATENTS

| | | | |
|---|---|---|---|
| 1,658,657 | 2/28 | Schaeffer | 188—129 |
| 1,697,395 | 1/29 | Lansing | 267—9 |
| 2,364,443 | 12/44 | Hornbostel | 100—168 |
| 2,850,952 | 9/58 | Hornbostel | 100—162 |
| 2,985,100 | 5/61 | Hornbostel | 100—163 |

FOREIGN PATENTS 109,413  9/17  Great Britain.

WALTER A. SCHEEL, Primary Examiner.

ABRAHAM G. STONE, Examiner.